United States Patent [19]

Igel

[11] Patent Number: 4,676,546

[45] Date of Patent: Jun. 30, 1987

[54] VEHICLE ROOF INSTALLATION WITH A WIND DEFLECTOR

[75] Inventor: Richard Igel, Germering, Fed. Rep. of Germany

[73] Assignee: Webasto-Werk W. Baier GmbH & Co, Gauting, Fed. Rep. of Germany

[21] Appl. No.: 812,525

[22] Filed: Dec. 23, 1985

[30] Foreign Application Priority Data

Dec. 21, 1984 [DE] Fed. Rep. of Germany ....... 3446916

[51] Int. Cl.⁴ .................................................. B60J 7/22
[52] U.S. Cl. ..................................... 296/217; 296/222
[58] Field of Search ............... 296/216, 217, 221, 222, 296/91; 16/357

[56] References Cited

U.S. PATENT DOCUMENTS

| 3,203,727 | 8/1965 | Werner | 296/217 X |
|---|---|---|---|
| 3,560,044 | 2/1971 | Helm | 296/91 |
| 3,711,150 | 1/1973 | Perks | 296/217 |
| 3,874,723 | 4/1975 | Coenen | 296/217 |
| 3,984,143 | 10/1976 | Vermeulen | 296/217 |
| 4,165,120 | 8/1979 | Jardin et al. | 296/217 |
| 4,268,085 | 5/1981 | Sakai et al. | 296/217 |
| 4,332,416 | 6/1982 | Lutz et al. | 296/216 |
| 4,380,351 | 4/1983 | Sorensen et al. | 296/217 |

FOREIGN PATENT DOCUMENTS

| 2046996 | 7/1977 | Fed. Rep. of Germany | 296/222 |
|---|---|---|---|
| 7510515 | 3/1977 | Netherlands | 296/217 |
| 7811769 | 6/1980 | Netherlands | 296/217 |

1540614 2/1979 United Kingdom .

Primary Examiner—Robert B. Reeves
Assistant Examiner—Dennis H. Pedder
Attorney, Agent, or Firm—Sixbey, Friedman & Leedom

[57] ABSTRACT

Vehicle roof with a roof opening that can be closed by a sliding cover, a framework surrounding the roof opening at least at the front and on the sides that forms a framed opening underneath the roof opening and a water channel that is defined by a protuberance in the framework, and with a wind deflector running parallel to the front edge of the roof opening. The wind deflector is held by at least one hinge located on the protuberance in the framework and can be swung out by spring power when the cover is pushed back and swung in when the cover is closed. The wind deflector, over substantially its full length, has an element with a first arm that is inclined upward and forward at an oblique angle in the swung-out position and a second arm that is angled down from its front end. The shaft of the hinge is located close to the rear end of the first arm. A part fastened permanently to the cover comes up against the top of the first arm of the wind deflector to swing the wind deflector. A portion of the deflector that is located where the first and second arms meet and that projects above the first arm and is shaped for producing a favorable air flow over the wind deflector. A shackle is attached via a notch-mount bearing eye to the wind deflector and is engaged on a forwardly directed projection of a bearing block of the hinge.

21 Claims, 5 Drawing Figures

VEHICLE ROOF INSTALLATION WITH A WIND DEFLECTOR

BACKGROUND AND SUMMARY OF THE INVENTION

The invention is concerned with a vehicle roof with a roof opening that can be closed with a sliding cover, a framework that surrounds the roof opening at least at the front and on the sides and forms a framed opening underneath the roof opening having a channel for water that is limited by a protuberance of the framework, and with a wind deflector running parallel to the front edge of the roof opening that is held by at least one hinge located on the protuberance of the framework and can be swung out around the shaft of the hinge by spring tension when the cover is pushed back as well as swung in against the spring tension when the cover is closed.

In a known vehicle roof of this kind U.S. Pat. No. 4,332,416, the shape of the deflector is essentially that of an elongated plate that can be swung around an axis located close to its front edge. One end of a lever is articulated to each end of the wind deflector and the lever extends rearwardly from the wind deflector to an opposite end which is articulated to a bearing that, in turn, is connected with a guide rail for the cover. When the cover is pushed forward, parts fastened permanently to the cover ride against the lever and press it down, lowering the deflector down, too. The known piece of apparatus requires a relatively large number of parts. Consequently, its manufacture and installation are relatively expensive where money and time are concerned.

Therefore, the invention has an object to provide a vehicle roof that requires an especially small number of structural parts and can be installed quickly and easily.

This object is achieved by the present invention by making the wind deflector have an element with a first arm that is inclined upward and forward at an oblique angle in the swung-out position and a second arm that is angled down from the front end of the first arm, by locating the shaft of the hinge close to the rear end of the first arm and by making a part fastened permanently to the cover come up against the top of the first arm of the wind deflector element to swing the wind deflector.

This manner of construction makes it possible to eliminate the need for lateral levers to activate the wind deflector and the swiveling bearings required for such levers.

The fact that a wind deflector element with a first arm that is inclined upward and forward at an oblique angle in the swung-out position and a second arm that is angled down from the front end of the first arm is already known (FIGS. 3 through 5 of British Pat. No. 1,540,614). In that piece of apparatus, however, to activate the wind deflector, a cam is attached to the front end of a forwardly spring-biased operating rod that is longitudinally displaceable and that extends to the rear along the lateral edge of the roof opening and has a catch at its rear end. When the cover is closed, the catch butts against a stop in a lateral water channel to limit the forward motion of the operating rod. There is a stop near the rear edge of the cover that comes up against the catch when the pushing back of the cover begins, and as a result the operating rod is pulled to the rear. The cam at the front end of the operating rod then presses against the bottom of attachments at the sides of the wind deflector element located at the back. The bottom of the attachments slopes downward at the rear. As a result of this, the wind deflector swings out against the power of a return spring. When the pushing back of the cover continues, the catch slips down from a guide plate mounted in the lateral water channel and is released from the stop in the cover as a result. Then the cover can be moved as far back as is desired without having any further influence on the wind deflector.

If this method of arrangement is used, the cost in time and money of manufacturing and installing is even greater than in the case of the first known vehicle roof described above. Furthermore, functioning parts of the wind deflector adjusting device are located in the channel for water. Consequently, they are more subject to corrosion. On the other hand, the piece of apparatus of the invention operates without having any functioning parts located in the water channel.

The hinge of the present invention can be connected directly with the protuberance of the framework. If a cable conduit covering is attached to the part of this protuberance that runs along the front edge of the framed opening, it is desirable, on the other hand, for the hinge to be connected with the cable conduit covering.

It is advantageous for the deflector to be held by two hinges that are displaced inward in the direction of the longitudinal central line of the roof with respect to the lateral edges of the wind deflector.

In further development of the invention, the wind deflector element is shaped so that, in the swung-in position of the wind deflector, its first arm covers the protuberance in the framework and the cable conduit covering, and its second arm projects into the water channel. In this way, the wind deflector also is a screen by which the visibility of underlying bolted connections between the cable conduit covering and the cable conduit is shielded, for example. The overall height can be kept especially small.

The wind deflector element can have a portion of its edge project above the level of the first arm at the point where the first and the second arms meet and join each other at an angle. Because the adjustment levers at the sides are eliminated, the length of the deflector can be such that the lateral edges of the wind deflector, in its swung-out position, are located immediately adjacent to the lateral edges of the roof opening. As a result, the penetration of drafts into the vehicle interior is also prevented in that area.

It is desirable to provide at least one slide bar, that is attached to the front end of the cover as a part permanently fastened to the cover, as an actuating member that comes up against the upper edge of the first arm of the wind deflector to lower it. An advantage of this is the fact that when the cover is pushed into its closed position the wind deflector remains extended for a particularly long time.

To further simplify installation, it is advantageous for the hinge to have a bearing block with sliding parts that can be inserted in guides in the cable conduit covering and for at least one catch to be provided to at least temporarily fix the bearing block that has been inserted in the guides with respect to the cable conduit covering.

The wind deflector element can be a bent sheet metal part or a profile part, and especially an unreworked profile part. In the latter case, it can have a light-metal, continuous-casting profile part. Each of the two lateral edges of the profile part is preferably covered by an end piece in order to obtain a clean and aesthetically pleasing closure of the profile part, even without reworking. When that is the case, the end pieces can have attachments on their sides that project inward and are inserted in a complementary receiver in the profile part and have seats for the shaft of the hinge at the same time. It is a good idea to have a torsion spring slipped onto the shaft of the hinge that rests against the wind deflector, on the one hand, and against the part of the roof that supports the wind deflector, on the other. The rear edge of the wind deflector element can constitute a stop that limits the outward-swinging movement of the wind deflector, and the wind deflector element can be connected with the bearing block by means of an additional holding shackle. To provide a better seal between the extended wind deflector and the border of the roof opening, the wind deflector element can carry a flexible sealing lip in the area of the lower end of the second arm.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
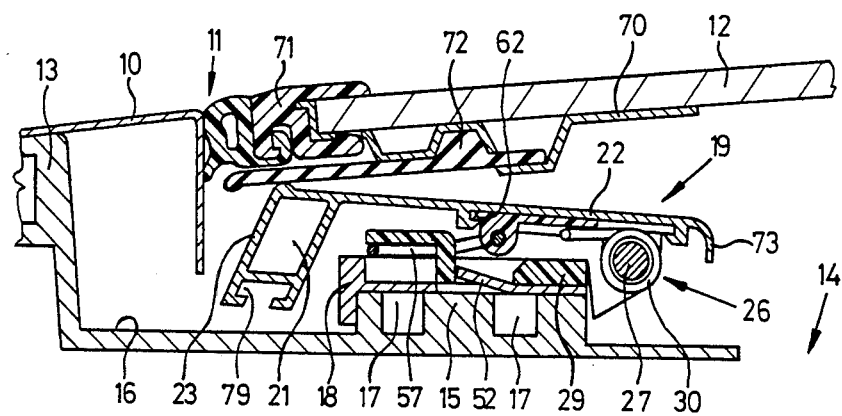
FIG. 1 shows a section of a vehicle roof in the area of the front edge of the roof opening, at the location corresponding to the line I-I through the wind deflector in FIG. 2.

In FIG. 1, a roof opening 11 is provided in the stationary roof part 10 of a vehicle roof that can be closed or a least partially opened, as desired, by means of a rigid, displaceble cover 12. The rear edge of the cover 12 can also be extended over the stationary part of the roof 10 in a conventional manner. The front and sides of the roof opening 11 are surrounded by a framework 13 that is connected to the stationary part of the roof 10. The framework 13 can be provided, in a conventional manner, with lateral rails (not shown) running in the longitudinal direction of the vehicle on which the cover 12 is guided by means of sliding guide shoes. The framework 13 also frames an opening 14, that is located under the roof opening 11, and has a protuberance 15 that defines a water channel 16 that extends along the front edge and the lateral edges of the roof opening 11. There are two cable conduits 17 in the protuberance 15 of the framework 13 to receive drive cables that are provided in a known way for displacing the cover 12. The cable conduits 17 are closed off, above, by a cable conduit covering 18 that extends at least along the front edge of the roof opening 11.

Furthermore, a wind deflector 19 with a wind deflector element 20 is located parallel to the front edge of the roof opening 11, and it can be made out of a light-metal extrusion, for example. There is a hollow space 21 in the element 20 for the purpose of economizing on weight. The wind deflector element 20 is equipped with a first arm 22 that is inclined upward and forward at an oblique angle in the swung-out position (shown in FIG. 5 for a modified embodiment) and a second arm 23 that is angled from the front end of the first arm 22. At the point where the first and the second arms meet and join each other at an angle, the wind element 20 has a portion of its edge 24 shaped to project above the level of the first arm 22 for ensuring an especially favorable control of the air flow, when the wind deflector is extended.

The wind deflector 19 is hinged to the cable conduit covering 18 by two hinges 26, only the left-hand one of which is shown in the drawings. The hinge 26 has a hinge shaft 27 that is located close to the rear end of the first arm 22 and is held by two bearings 28 of a bearing block 29 that constitutes a part of the hinge 26. Between the bearings 28, a torsion spring in the form of a double-arm torsion coil spring 30 is supported in a recess 32 in the bearing block 29 while its other arm 33 lies under the bottom of the wind deflector element 20 in a prestressed condition. The spring 30 tries to bring the wind deflector element 20 into the extended position, in which the second arm 23 projects above the level of the permanent part 10 of the roof at an angle sloping upwardly toward the rear.

There are stepped lateral guide surfaces 35 on both sides of the bearing block 29 that extend in a pushing-in direction, as is indicated by an arrow 36. The end of the bearing block 29 that is located away from the bearings 28 constitutes a stop edge 37 that is at right angles to the pushing-in direction. Upper guide surfaces 39, 40, that are stepped downward from the top 38 or the bearing block 29, are located on both sides of the bearing block 29, adjacent to the lateral guide surface 35. Oblique surfaces 41 are located on both sides of bearing block 29, running between a respective lateral guide surface 35 and the stop edge 37. Furthermore, a catch opening 53 is provided in bearing block 29.

The cable conduit covering 18 has a bearing block receiver 44 with guides that complement the guide parts of the bearing block 29. In particular, each receiver 44 is formed by lateral guides 45 (which cooperate with the lateral guide surfaces 35 of the bearing block 29), a stop surface 46 (which cooperates with stop edge 37), a support surface 47 (which supports a bottom surface 48 of the bearing block 29) and counterflanges 49 (that coact with the upper guide surfaces 39, 40). In the central area of the support surface 47, there is a U-shaped cutout 50 from which a flexibly deflectable tongue 52 arises so that a free end 51 thereof projects above the support surface 47 in its relaxed state.

When the bearing block 29 is pushed into the receiver 44, the oblique surfaces 41, first, provide an automatic centering of the bearing block 29 in relation to the receiver 44. The bottom surface 48 of the bearing block 29 presses the tongue 52 downward. The dimensions of the coacting parts are selected such that, when the stop edge 37 reaches the stop surface 46, the edge 54 of the catch opening 53, that is farther away from the shaft 27, has run past the end 51 of the tongue 52. Therefore the tongue 52 springs back and its end 51 comes into catch opening 53, so that withdrawal of block 29 will be prevented by the end 51 abutting against wall 54 of catch opening 53. Not only, in this way, is the bearing block 29 further fixed in its pushed-in position, but at the same time, the upper guide surfaces 39, 40 are resiliently pushed upwardly against the countersurfaces 49 by the tongue 52.

Figure 5:
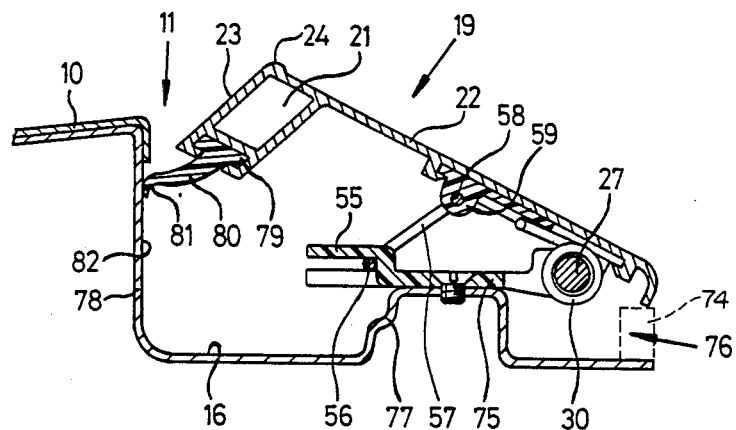
FIG. 5 is a sectional view similar to that shown in FIG. 1 for a modified embodiment of the vehicle roof of the present invention.
Figure 3:
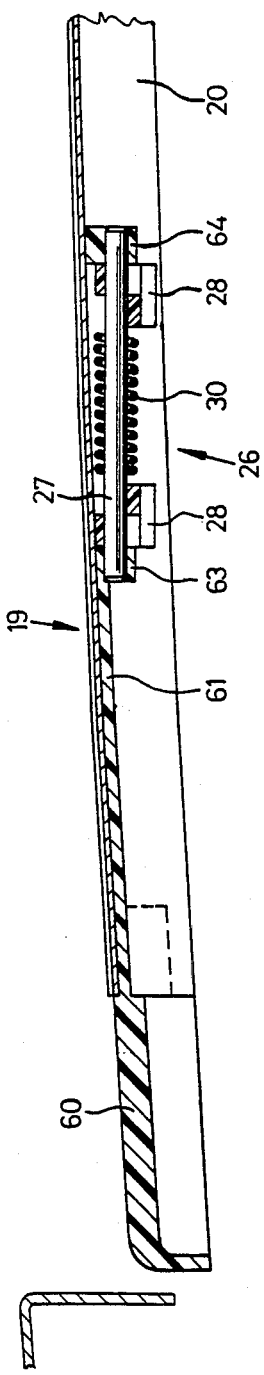
FIG. 3 is a longitudinal section through the wind deflector taken along the line III—III in FIG. 2.

A forwardly directed hook 55 projects above the top 38 of the bearing block 29. One arm 56 of a U-shaped holding shackle 57 lies under the hook 55 (FIGS. 1 and 5). The other arm 58 of the holding shackle 57 is inserted in a bearing eye 59 in an end piece 60 of the wind deflector 19. The holding shackle 57 limits the swinging-out movement of the wind deflector 19 under the influence of the spring 30.

A notch 62 (FIG. 2) extends longitudinally along the bottom of the wind deflector element 20, near the rear side of the arm 22. Mounting projections 61 of an end piece 60 are inserted in the notch 62 from both sides of the wind deflector element 20 and, when that is done, a mating connection between the wind deflector element 20 and the end pieces 60 is produced, as can best be perceived in FIGS. 1 and 2. Laterally protruding projections 68, that engage in complementary recesses 69 in the projections 61, also constitute a part of this mating connection. In the case of the end pieces 60, it is desirable for them to be plastic parts, and especially plastic shapes that ensure a clean lateral closure of a wind deflector element 20 that, preferably, is an unmachined profile part.

Figure 2:
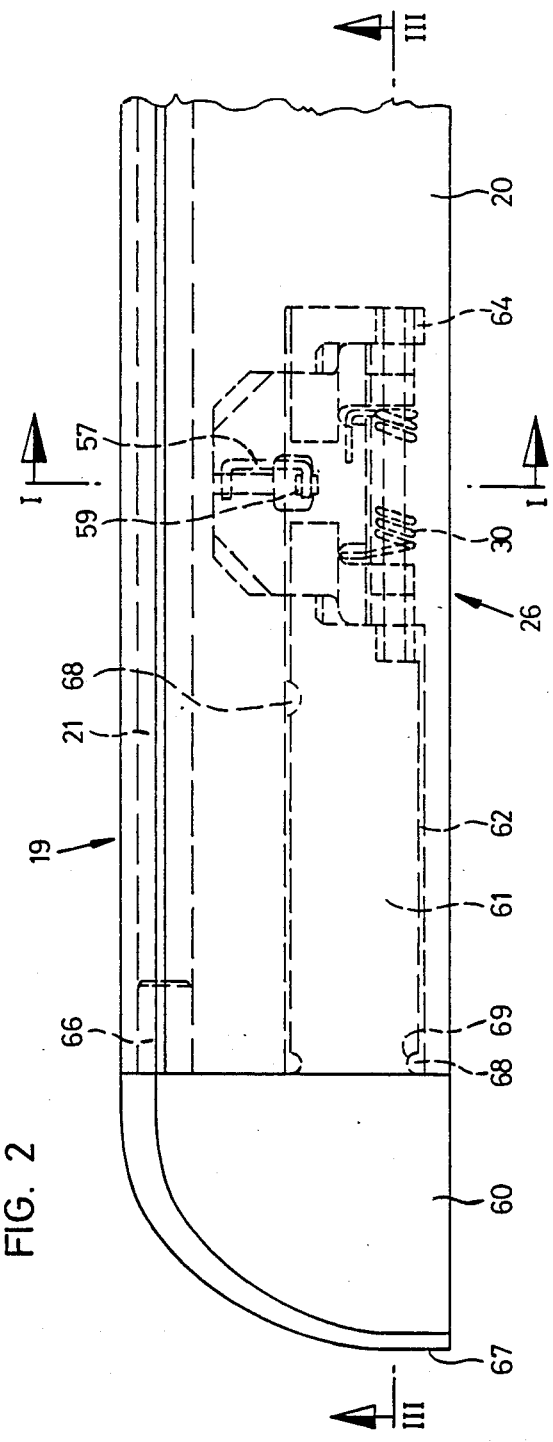
FIG. 2 is a plan view of the left-hand part of a deflector of the vehicle in accordance with the present invention.

The inner located end of the mounting projections 61 of the end pieces 60 has two bearing points 63, 64 in the form of bearing eyes. The ends 65 of the hinge shaft 27 engage within the bearing points 63, 64. A shorter projection 66 of the end piece 60 extends into the hollow space 21 (FIG. 2). It is desirable for the width of the wind deflector 19, including the two lateral end pieces 60, to be such that the outer lateral edges 67 of the end pieces 60 are immediately adjacent to the lateral edges of the roof opening 11 in the swung-out position of the wind deflector 19.

The cover 12, which is made of transparent or translucent material, for example, is surrounded by a cover framework 70 that supports a sealing element 71 that extends around the outer edge of the cover 12 and comes up against the edge of the roof opening 11 when the cover 12 is closed (FIG. 1). Furthermore, two slide bars 72 are attached to the cover framework 70 at points that are aligned with the two hinges 26. These slide bars 72 are, preferably, made of plastic and are secured to the cover framework 70 with clips. When the cover 12 is pushed forward in the direction of the closed position shown in FIG. 1, the slide bars 72 come up against the top of the first arm 22, engaging on the shaped edge 24, as can be appreciated from FIG. 1. As a result, the wind deflector 19 is swung in a counterclockwise direction around the two hinge shafts 27 into the FIG. 1 position. In the swung-in position (FIG. 1), the first arm 22 of the wind deflector element 20 covers the cable conduit covering 18, while the second arm 23 projects into the water channel 16.

When the cover 12 is pushed back, the slide bars 72 release the wind deflector 19 so that it moves in a clockwise direction bringing the deflector 19 into its swung-out position under the action of the torsion coil springs 30. In addition to, or instead of using the holding shackle 57 for limiting the angle through which the wind deflector swings out when installed, the swung-out position can be limited by having the rear edge 73 of the wind deflector element 20 strike against an opposing part 74 as shown in broken lines in FIG. 5.

In the modified embodiment shown in FIG. 5, bearing blocks 75 of hinges 76 are fastened directly to a protuberance 77 in the framework of a frame 78, for example, they are bolted to it. A flexible sealing lip 80, which should to extend over the full length of the wind deflector element 20, is inserted into a groove 79 that runs along the lower end of the second arm 23 of the wind deflector element 20. When the wind deflector is extended, that is, when it is in the operating position shown in FIG. 5, the free end 81 of the lip 80 butts against the front edge 82 of the roof opening 11.

Figure 4:
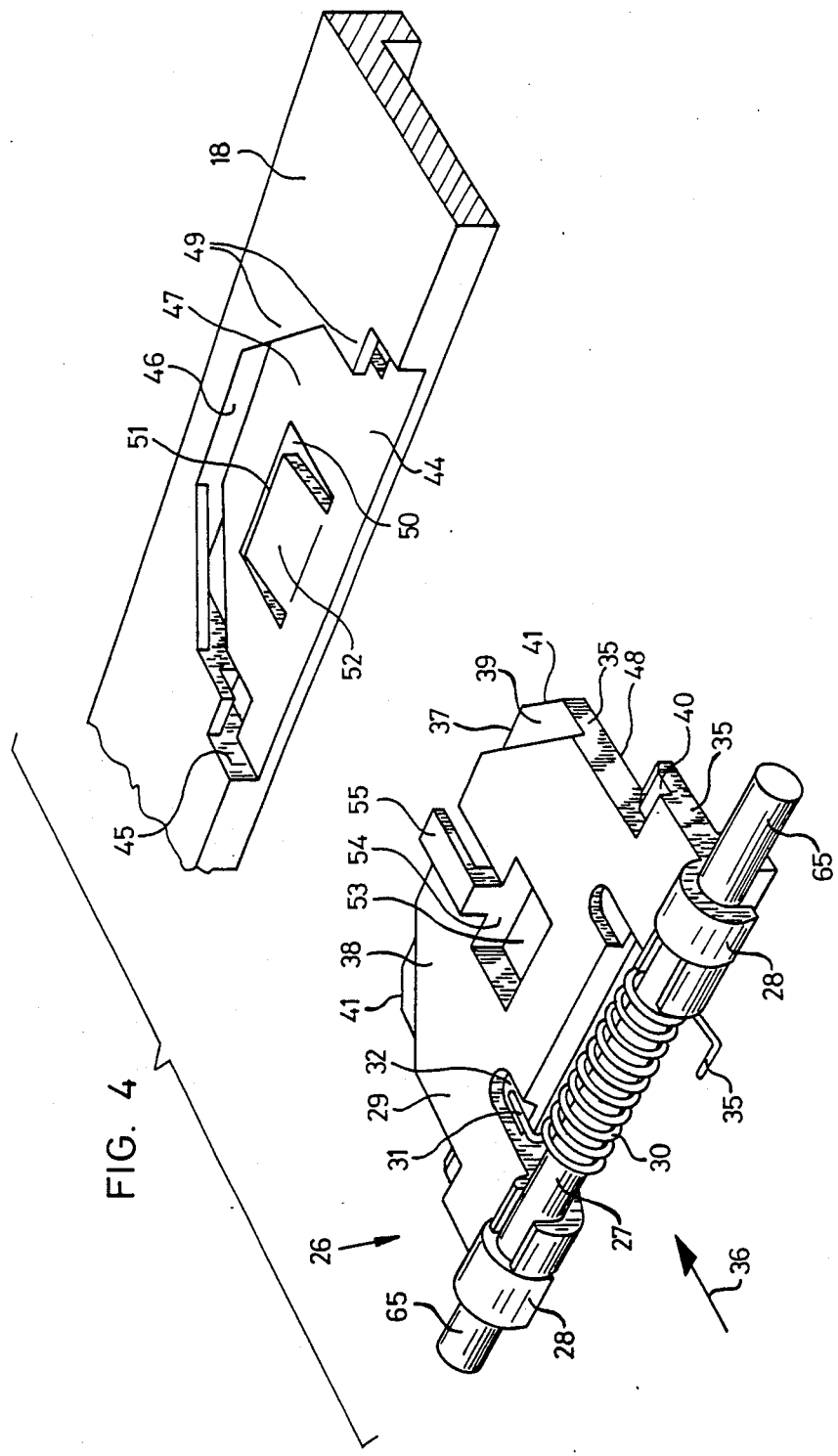
FIG. 4 is an exploded perspective view of one hinge and a part of the cable conduit covering of the vehicle roof shown in FIG. 1.

As far as any other features are concerned, this embodiment corresponds to that shown in FIGS. 1 and 4. Of course, the sealing lip 80 can also be provided in the embodiment of FIGS. 1-4, if desired.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the cope of the appended claims.

I claim:

1. A sliding roof assembly for a vehicle comprising a framework, a cover assembly including a cover for opening and closing a roof opening in use, and a wind deflector mounted on the framework to extend across the front of the roof opening for movement, about a transversely extending hinge axis of at least one hinge, between a swung-in position and a swung-out position toward which latter position the wind deflector is urged by biasing means, wherein the wind deflector comprises, in section, over substantially its full length, a first arm and a second arm which meet such that, in the swung-out position, the first arm rises obliquely forward relative to a plane defined by the roof opening and the second arm is angled down from a front end of the first arm, the assembly being so constructed and arranged that a part of the cover assembly bears against the first arm during forward sliding movement of the roof panel to depress the wind deflector to the swung-in position.

2. Vehicle roof as claimed in claim 1, wherein the hinge is directly connected with a protuberance in the framework.

3. Vehicle roof as claimed in claim 1, wherein a cable conduit covering is attached upon a part of a protuberance in the framework that runs along the front edge of the roof opening, and wherein the hinge is mounted to the cable conduit covering.

4. Vehicle roof as in claim 1, wherein the wind deflector is held by two hinges that are displaced inward, in the direction of the longitudinal center line of the roof, with respect to the lateral edges of the wind deflector.

5. Vehicle roof as claimed in claim 3, wherein in the swung-in position of the wind deflector, the first arm of the wind deflector element covers the protuberance in the framework and the cable conduit covering, and the second arm of the wind deflector element projects into a water channel defined by the protuberance.

6. Vehicle roof as claimed in claim 1, wherein the wind deflector has an edge portion at the point where the first and the second arms meet that projects above the level of the first arm.

7. Vehicle roof as claimed in claim 1, wherein the wind deflector is dimensioned relative to the roof opening in a manner that lateral edges of the wind deflector are directly adjacent to lateral edges of the roof opening when the wind deflector is in its swung-out position.

8. Vehicle roof as claimed in claim 1, wherein at least one slide bar is provided as said part of the cover assembly and is fastened to the front end of the cover.

9. Vehicle roof as claimed in claim 3, wherein the hinge has a bearing block with guiding surfaces that are receivable in co-acting guides of the cable conduit covering, and wherein at least one catch for at least temporarily fixing of the bearing block, in the guides, with respect to the cable conduit covering is provided.

10. Vehicle roof as claimed in claim 1, wherein the wind deflector is an unmachined profile part.

11. Vehicle roof as claimed in claim 10, wherein the profile part is a light-metal, continuous-casting profile part.

12. Vehicle roof as claimed in claim 11, wherein each of two lateral edges of the profile part is covered by an end piece.

13. Vehicle roof as claimed in claim 9, wherein the rear edge of the wind deflector element constitutes a stop that limits the swinging out movement of the wind deflector.

14. Vehicle roof as claimed in claim 9, wherein the wind deflector element is additionally connected with the bearing block by means of a holding shackle.

15. Vehicle roof as claimed in claim 1, wherein the wind deflector element supports a flexible sealing lip at the lower end of the second arm for sealing against said framework in the swung-out position of the wind deflector.

16. Vehicle roof as claimed in claim 5, wherein the wind deflector element supports a flexible sealing lip at the lower end of the second arm for sealing against said framework in the swung-out position of the wind deflector.

17. Vehicle roof as claimed in claim 7, wherein the wind deflector element supports a flexible sealing lip at the lower end of the second arm for sealing against said framework in the swung-out position of the wind deflector.

18. Vehicle roof with a roof opening, a sliding cover for closing of the roof opening, a framework for the roof opening that forms a framed opening underneath the roof opening and a water channel that is defined by a protuberance in the framework, and with a wind deflector running parallel to a front edge of the roof opening that is held by at least one hinge located on the protuberance in the framework and which is pivotable about a shaft of the hinge into a swung-out position by spring force when the cover is slid from a closed position and is displaceable into a swung-in position against the spring force when the cover is closed, wherein the wind deflector is a profiled part that has a blade-like element with a first arm that is inclined upward and forward at an oblique angle relative to a plane defined by the roof opening in the swung-out position and a second arm that is angled down from the front end of the first arm, wherein the shaft of the hinge is located close to a rear end of the first arm, wherein a part fastened to the cover is provided for engagement against a top surface of the first arm of the wind deflector element for swinging the wind deflector in, and wherein end pieces are provided for covering lateral edges of the profiled part and have mounting projections that project into a complementary receiver of the profile part and have bearing seats for the shaft of the hinge.

19. Vehicle roof as claimed in claim 18, wherein a torsion spring is slipped onto the shaft of the hinge and has arms that rest against the wind deflector, on the one hand, and against the part of the roof that supports the wind deflector, on the other.

20. Vehicle roof with a roof opening, a sliding cover for closing of the roof opening, a framework for the roof opening that forms a framed opening underneath the roof opening and a water channel that is defined by a protuberance in the framework, and with a wind deflector running parallel to a front edge of the roof opening that is held by at least one hinge located on the protuberance in the framework and which is pivotable about a shaft of the hinge into a swung-out position by spring force when the cover is slid from a closed position and is displaceable into a swung-in position against the spring force when the cover is closed, wherein the wind deflector has a blade-like element with, in section, over substantially its full length, a first arm that is inclined upward and forward at an oblique angle relative to a plane defined by the roof opening in the swung-out position and a second arm that is angled down from a front end of the first arm, wherein the shaft of the hinge is located close to a rear end of the first arm, wherein a part fastened to the cover is provided for engagement against a top surface of the first arm of the wind deflector element for swinging the wind deflector in, and wherein said hinge on the protuberance has a bearing block with a forwardly directed projection, wherein a bearing eye part is attached via a notch to the wind deflector and wherein a shackle inserted into the bearing eye part engages upon said projection for limiting swinging-out movement of the wind deflector.

21. Vehicle roof with a roof opening, a sliding cover for closing of the roof opening, a framework for the roof opening that forms a framed opening underneath the roof opening and a water channel that is defined by a protuberance in the framework, and with a wind deflector running parallel to a front edge of the roof opening that is held by at least one hinge located on the protuberance in the framework and which is pivotable about a shaft of the hinge into a swung-out position by spring force when the cover is slid from a closed position and is displaceable into a swung-in position against the spring force when the cover is closed, wherein the wind deflector has a blade-like element with, in section, over substantially its full length, a first arm that is inclined upward and forward at an oblique angle relative to a plane defined by the roof opening in the swung-out position and a second arm that is angled down from a front end of the first arm, wherein the shaft of the hinge is located close to a rear end of the first arm, wherein a part fastened to the cover is provided for engagement against a top surface of the first arm of the wind deflector element for swinging the wind deflector in, and wherein the wind deflector has an edge portion at the point where the first and second arms meet, said portion projecting above the level of the first arm for engagement by said part fastened to the cover and being shaped for ensuring a favorable control of air flowing over the wind deflector in its swung-out position.

* * * * *